No. 730,797. PATENTED JUNE 9, 1903.
H. RENTSCH.
FURROW OPENER ATTACHMENT FOR CORN PLANTERS.
APPLICATION FILED NOV. 24, 1902.

NO MODEL. 2 SHEETS—SHEET 1.

Witnesses
Inventor
Henry Rentsch
by Higdon & Longan attys

No. 730,797. PATENTED JUNE 9, 1903.
H. RENTSCH.
FURROW OPENER ATTACHMENT FOR CORN PLANTERS.
APPLICATION FILED NOV. 24, 1902.
NO MODEL. 2 SHEETS—SHEET 2.
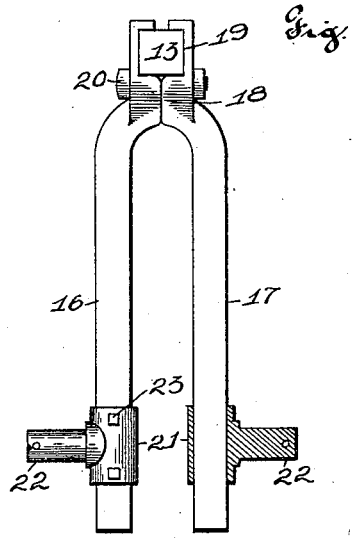
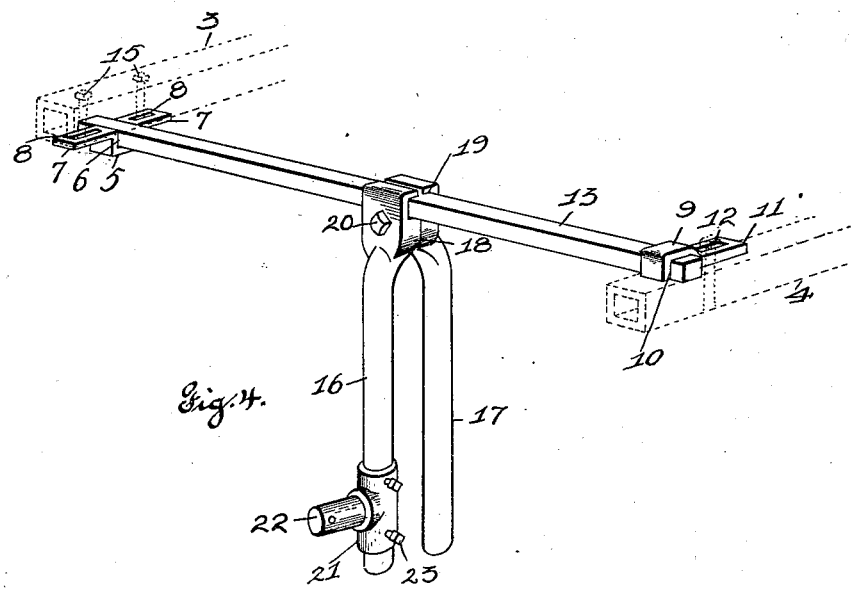

No. 730,797. Patented June 9, 1903.

UNITED STATES PATENT OFFICE.

HENRY RENTSCH, OF BACON, MISSOURI.

FURROW-OPENER ATTACHMENT FOR CORN-PLANTERS.

SPECIFICATION forming part of Letters Patent No. 730,797, dated June 9, 1903.

Application filed November 24, 1902. Serial No. 132,647. (No model.)

*To all whom it may concern:*

Be it known that I, HENRY RENTSCH, of the city of Bacon, Moniteau county, State of Missouri, have invented certain new and useful Improvements in Furrow-Opener Attachments for Corn-Planters, of which the following is a full, clear, and exact description, reference being had to the accompanying drawings, forming a part hereof.

The object of my invention is to construct an improved furrow-opener for corn-planters consisting in the novel features hereinafter shown, described, and claimed.

Figure 1:
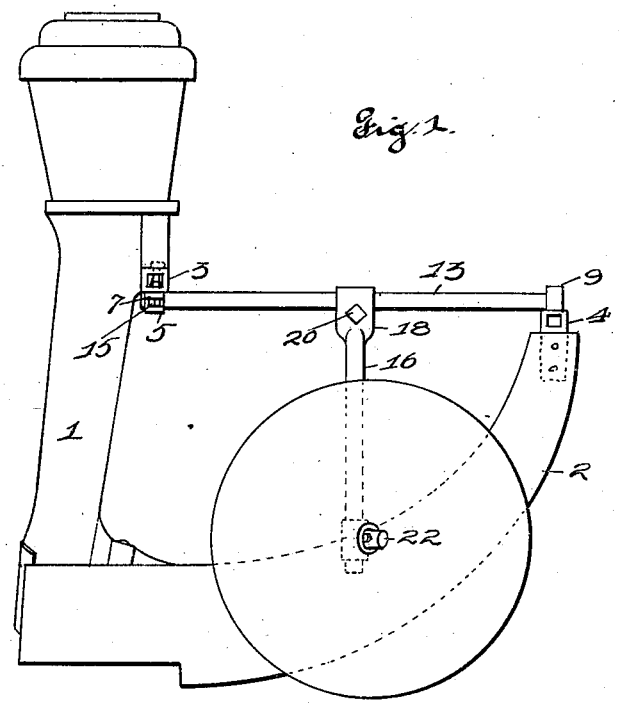
Figure 2:
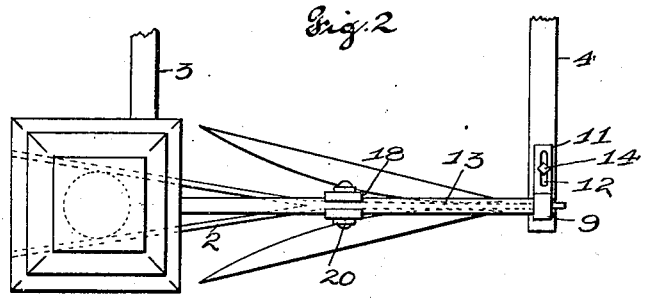

Figure 1 is a side elevation of a corn-planter, showing my invention applied to same. Fig. 2 is a top plan view. Fig. 3 is a detail view of the disk-carrying standards and the portion to which they are attached. Fig. 4 is a perspective view of my invention.

My present invention is designed as an improvement on Patents Nos. 710,211 and 710,303, granted to me September 30, 1902.

Referring to the drawings in detail, 1 indicates the usual seed-chute or casing, and 2 the runner or furrow-opener, it being understood in this connection that I have only shown one side of the corn-planter and shown my invention applied to only one side of the corn-planter, the remaining side of the corn-planter being done in the same manner.

3 indicates a transverse bar passing from one of the chutes to the other, and 4 indicates a similar transverse bar passing from the front end of one runner to the other runner 2.

5 indicates a clip having a square socket 6 and ends 7, provided with elongated openings 8, and said clip is adapted to be bolted underneath the transverse bar 3.

9 indicates another clip provided with a square socket 10 and an end 11, provided with an elongated opening 12, and said clip 9 is adapted to be bolted on top of the transverse bar 4.

13 indicates a longitudinal angular rod which extends from the bar 3 to the bar 4, the ends of said rod 13 being adapted to fit in the sockets 6 and 10 of the clips 5 and 9. By means of this construction the rod or bar 13 is prevented from turning or rotating. The clip 9 is adapted to be bolted on top of the transverse bar 4 by means of a bolt 14. The clip 5 is adapted to be bolted underneath the transverse bar 3 by means of bolts 15. By means of the elongated openings in the clips 5 and 9 they are laterally adjustable in and out on the bars 3 and 4.

16 indicates one disk-carrying standard, and 17 the other. Said disk-carrying standards are provided with mating jaws or clamping portions 18, and formed in said mating jaws are square sockets 19. The rod 13 is made to fit into these sockets 19 when the jaws or mating portions 18 of the disk-carrying standards 16 and 17 are clamped and held together by the bolt 20. Whenever said disk-carrying standards 16 and 17 are secured to the bar 13, the said standards are prevented from lateral movement, it being understood in this connection that by loosening the nut on the bolt 20 the standards may be adjusted in a longitudinal manner to the front or rear end of the rod 13.

21 indicates a tubular sleeve to which is attached the axle 22 on which the disk is mounted. Said sleeve 21 is vertically adjustable and is held in the desired adjustment by means of the set screws or bolts 23.

From the foregoing description it can be seen that the front end of the bar 13 is mounted on top of the transverse bar 4 and the rear end is mounted underneath the transverse bar 3, and whenever the planter is in operation there will be a rearward strain on the standards 16 and 17, which imparts to the front end of the bar 13 a downward pull and also has a tendency to produce an upward pull on the rear end of the bar 13. This arrangement produces a stronger and more effective structure than if both ends of the bar 13 were mounted on top of the transverse bars 3 and 4.

Having fully described my invention, what I claim is—

1. The improved furrow-opening attachment for corn-planters, comprising two parallel transverse bars, the longitudinal rod 13 angular in cross-section, means for adjustably securing the ends of the latter upon the said parallel bars, and a pair of furrow-opening disks supported by said longitudinal rod, substantially as specified.

2. The improved furrow-opening attachment for corn-planters, comprising two parallel transverse bars, the longitudinal rod 13 angular in cross-section, means for adjustably securing the ends of the latter upon the said parallel bars, adjustable clips 5 and 9 provided with angular sockets, and a pair of furrow-opening disks supported by said longitudinal rod, substantially as specified.

3. The improved furrow-opening attachment for corn-planters, comprising two parallel transverse bars, the longitudinal rod 13 angular in cross-section, means for adjustably securing the ends of the latter upon the said parallel bars, parallel disk-carrying standards 16 and 17 provided with angular mating jaws having mating sockets and adjustably secured in position upon said angular rod, and disks mounted upon said standards, substantially as specified.

4. The combination with the transverse bars 3 and 4 of a corn-planter, of laterally-adjustable clips 5 and 9 provided with square sockets, an angular supporting-bar 13 the ends of which are located in said sockets, the front end of said bar being located on top of the transverse bar 4 and the rear end underneath the bar 3; disk-carrying standards 16 and 17 provided with angular mating jaws provided with mating sockets, and disks adjustably mounted upon said standards, substantially as specified.

In testimony whereof I affix my signature in presence of two witnesses.

HENRY RENTSCH.

Witnesses:
EDWARD E. LONGAN,
ALFRED A. EICKS.